United States Patent
Gonzalez Middleton

(10) Patent No.: US 10,176,788 B2
(45) Date of Patent: Jan. 8, 2019

(54) STRING TENSIONING USING MOVEABLE GEARS

(71) Applicant: Eduardo Edison Gonzalez Middleton, Sunny Isles, FL (US)

(72) Inventor: Eduardo Edison Gonzalez Middleton, Sunny Isles, FL (US)

(*) Notice: Subject to any disclaimer, the term of this patent is extended or adjusted under 35 U.S.C. 154(b) by 408 days.

(21) Appl. No.: 14/262,687

(22) Filed: Apr. 25, 2014

(65) Prior Publication Data

US 2017/0193973 A1    Jul. 6, 2017

(51) Int. Cl.
*G10D 3/14* (2006.01)
*G10H 1/00* (2006.01)
*F16H 1/16* (2006.01)

(52) U.S. Cl.
CPC .............. *G10D 3/14* (2013.01); *F16H 1/16* (2013.01)

(58) Field of Classification Search
CPC ............ G10D 3/14; G10D 3/12; G10D 3/146; G10D 3/143; G10C 9/00; G10F 1/06; G10G 7/02
See application file for complete search history.

(56) References Cited

U.S. PATENT DOCUMENTS

| 4,151,778 A * | 5/1979 | Beattie | G10D 3/14 84/306 |
| 2004/0094013 A1* | 5/2004 | Gotoh | G10D 3/14 84/304 |

* cited by examiner

*Primary Examiner* — Marlon Fletcher
(74) *Attorney, Agent, or Firm* — Fleit Gibbons Gutman Bongini & Bianco PL; Paul D. Bianco; Gary S. Winer

(57) ABSTRACT

On a worm drive the second bushing of the worm is replaced with an oblique thrust surface or made to follow a path constraining the worm to move closer to the gear as it is pushed forward by the gear itself as a result of the torque applied by the load. The oblique forces thus generated push the worm towards the gear and constitute a meshing force that makes the system self-adjusting with zero play between the parts, eliminating backlash and dependency from manufacturing tolerances and from the effects of wear. It also results in freedom of movement between worm and gear allowing them to be easily disengaged. The meshing force is predictable and independent from the deformability of the parts, and makes possible the use of stronger triangular teeth, allowing much higher gear ratios.

24 Claims, 11 Drawing Sheets

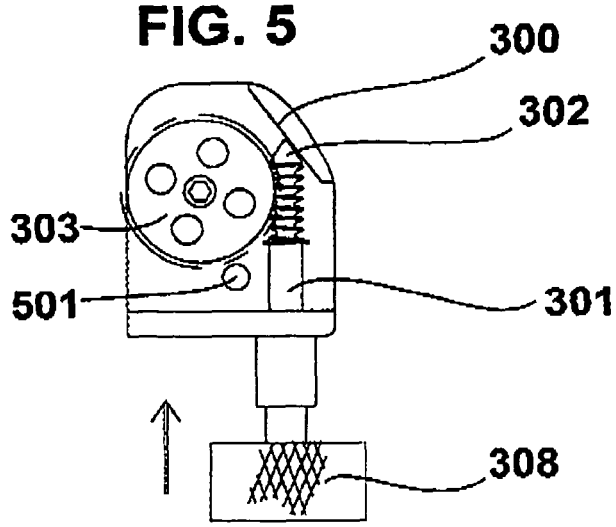
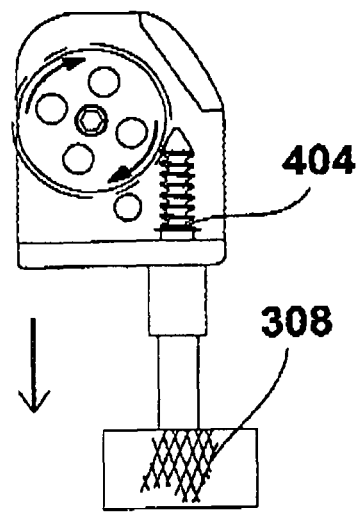
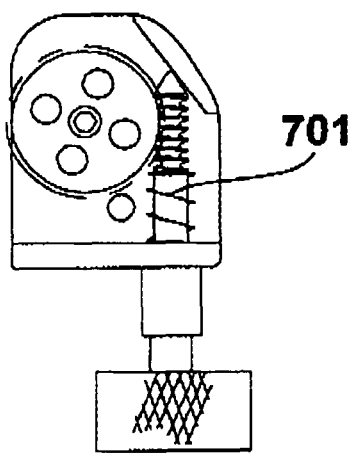
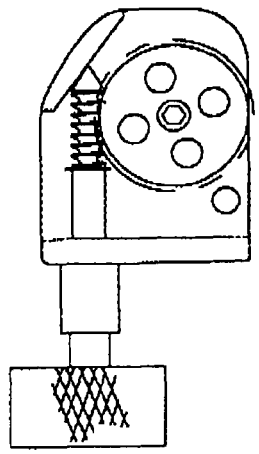

2601

2700

2701

2702

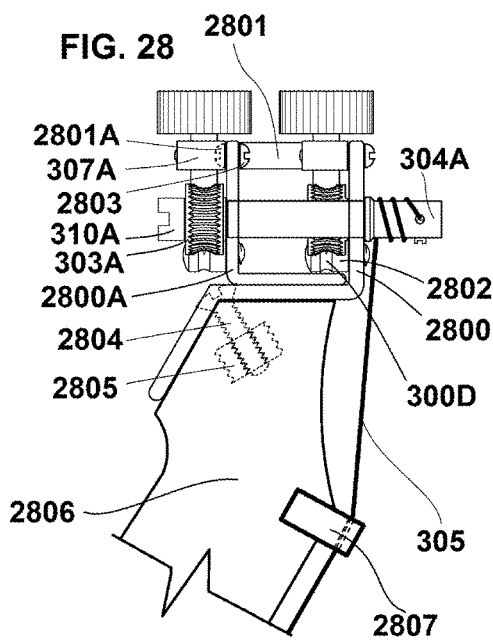
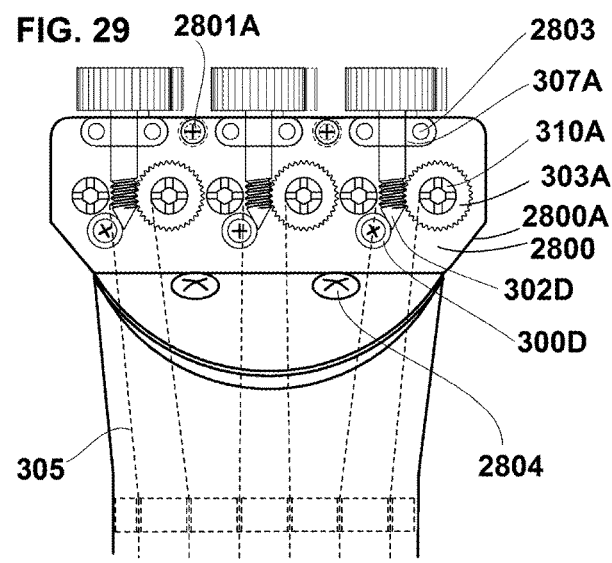
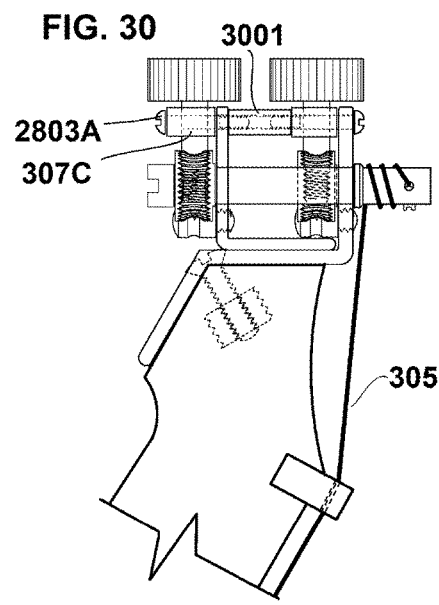
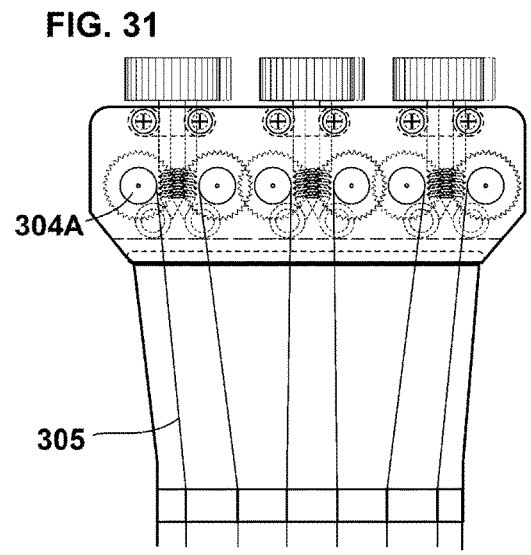

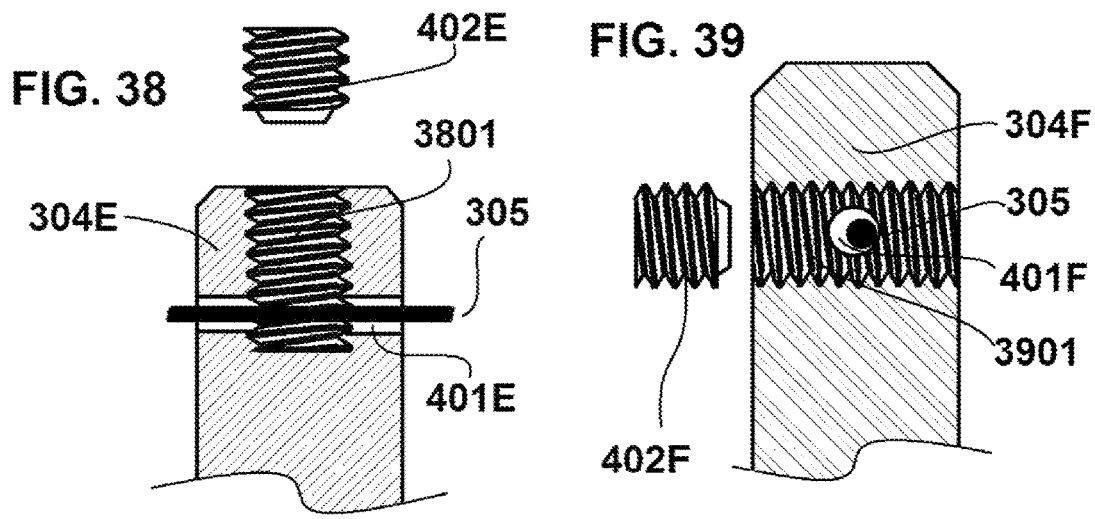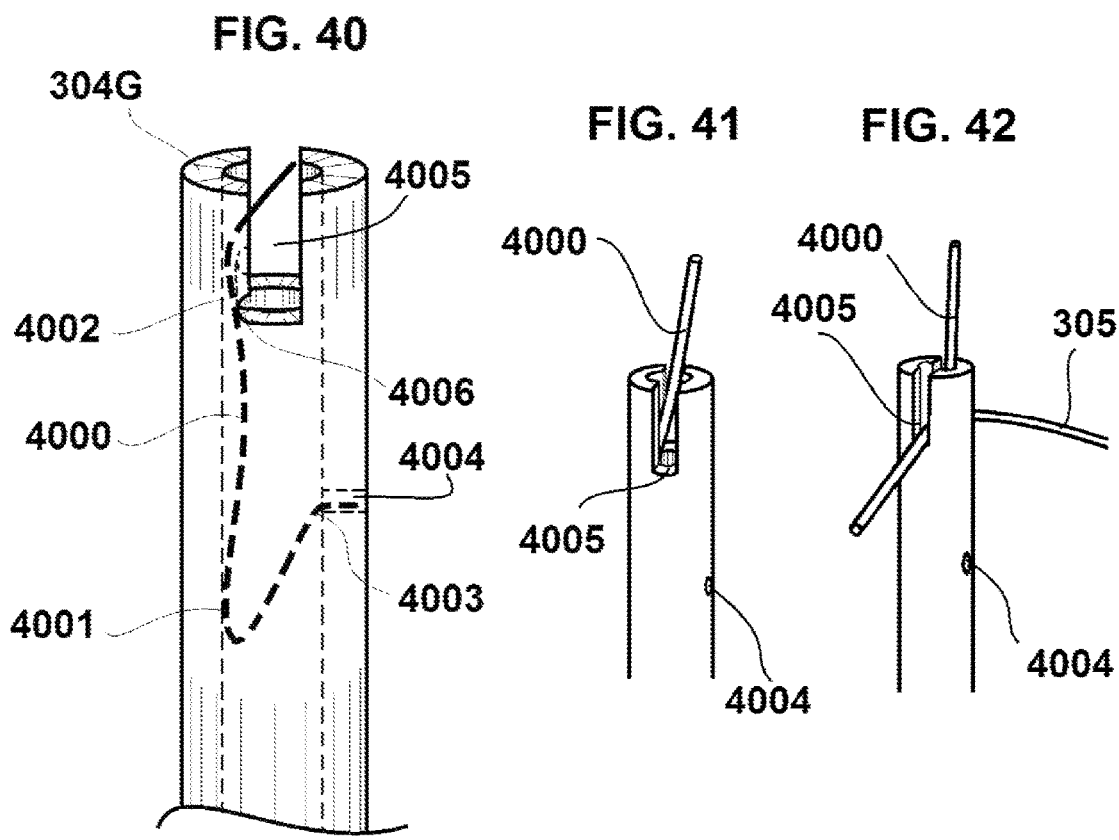

STRING TENSIONING USING MOVEABLE GEARS

CROSS REFERENCE TO RELATED APPLICATIONS

PROVISIONAL PATENT APPLICATION No. 61/775,588 OF Mar. 10, 2013
PROVISIONAL PATENT APPLICATION No. 61/816,154 OF Apr. 25, 2013
PROVISIONAL PATENT APPLICATION No. 61/822,094 OF May 15, 2013

BACKGROUND

Worm drives have been known at least since Leonardo da Vinci draw a sketch of the device in the early 1500s. These mechanisms are efficient at transmitting high torques to the load but present significant shortcomings in applications where a high precision is required in setting the angular position of the shaft, mainly because of play between the parts and/or because of the friction forces manufactured in to reduce play. A typical application of this mechanism as a tuning machine is shown in FIGS. 1 and 2. It consists of a worm (1) which receives the working torque through a button (1A) and is in mesh with a gear (2) attached to a shaft (3) that transmits the resulting higher torque to the load which is the tension of the string (4); a frame (5) that includes two bearings for the worm: a first bearing (6) closer to the button and a second bearing (7) at the tip of the worm, plus one bearing (8) for the shaft, the other bearing for the shaft being provided by a bushing inserted on a hole on the head of the instrument where the tuning machine is installed.

SUMMARY OF THE DISCLOSURE

In accordance with the disclosure, a device to adjust a string tension, comprises a worm drive including a worm and a worm wheel; a first bearing on a first side of the worm; a second bearing on a second side of the worm opposite to the first side of the worm; and a thrust surface affixed relative to the worm wheel, the second bearing mateable with the thrust surface to urge the worm and worm wheel closer together when the worm wheel is under load.

In various embodiments thereof, the worm drive is axially displaceable; the second bearing and the thrust surface are slidable relative to each other as the worm is rotated and displaced axially; the worm drive is displaced axially as the worm wheel applies a load to the worm; the worm and the worm wheel have mating teeth that are substantially triangular in profile; the worm wheel includes threads that are concave; the worm wheel includes threads that form a toroidal shape; and/or the worm is sufficiently axially displaceable to be slid out of mating engagement with the worm wheel.

In another embodiment, the device further includes a tool engagement connected to the worm wheel, the engagement coaxial with a rotational axis of the worm wheel, the tool engagement thereby configured to rotate the worm wheel when the tool engagement is driven by a mating tool.

In a yet further embodiments thereof, the second bearing and the thrust surface form mating angled ramps.

In accordance with another embodiment of the disclosure, a device to adjust a string tension, comprises a worm drive including a worm having threads, the worm rotatable about a longitudinal axis, the worm axially displaceable along the longitudinal axis, and a worm wheel having threads mateable with the worm threads; a bearing surface formed upon the worm and extending away from the worm threads; and a thrust surface forming a non-orthogonal angle relative to a longitudinal axis of the worm, the thrust surface positioned in a predetermined location relative to the worm wheel, the thrust surface slideably mateable with the bearing surface to urge the worm threads against the worm wheel threads when the worm wheel urges the worm axially under a load transferred from the worm wheel threads to the worm threads.

In various embodiments thereof, the device further includes a tuning shaft extending away from the worm threads, and a string takeup shaft affixed to and extending from the worm wheel; the device further includes a biasing element disposed within an opening in an end portion of the string takeup shaft, the biasing element configured to releaseably secure a string when the string is inserted in contact with the biasing element.

In other embodiments thereof, the device further includes a set screw threadably retained within the string takeup shaft, the set screw configured thereby to releaseably secure a string inserted into the string takeup shaft; the device further includes a support shaft axially aligned with the worm threads to rotatably support the worm, and a bushing sized larger than the outside diameter of the support shaft, to thereby rotatably support the worm, and to enable the worm to tilt towards the worm gear when the worm is displaced axially; the string tension is adjusted to tune a stringed musical instrument; the gear ratio of the worm drive is greater than 1:40 and up to 1:100; and/or the device further includes a biasing element associated with the worm configured to bias the support shaft with respect to the bushing.

In another embodiment of the disclosure, a device to adjust a string tension of a musical instrument, comprises a plurality of string tensioner assemblies, each comprising: a worm drive including a worm including a shaft supporting worm threads, the worm rotatable about a longitudinal axis, the worm axially displaceable along the longitudinal axis, and a worm wheel rotatably affixed to the instrument, and having threads mateable with the worm threads; a bearing surface formed upon the worm shaft and extending away from the worm threads; a thrust ramp forming a non-orthogonal angle relative to a rotational axis of the worm, the thrust surface affixed to the instrument, the thrust ramp slideably mateable with the bearing surface to urge the worm threads against the worm wheel threads when the worm wheel urges the worm axially under a load transferred from the worm wheel threads to the worm threads; and a bushing affixed to the instrument, the bushing sized larger than the outside diameter of the worm shaft, to thereby rotatably support the worm, and to enable the worm to tilt towards the worm gear when the worm is displaced axially.

In an embodiment thereof, the device further includes a tool engagement affixed to the worm wheel, the engagement coaxial with a rotational axis of the worm wheel, the tool engagement thereby configured to rotate the worm wheel when the tool engagement is driven by a mating tool.

BRIEF DESCRIPTION OF THE DRAWINGS

A more complete understanding of the present disclosure, and the attendant advantages and features thereof, will be more readily understood by reference to the following detailed description when considered in conjunction with the accompanying drawings wherein:

101—Worm (Also referred to as "worm gear") in accordance with the disclosure
102—First fixed bearing
103—Second fixed bearing
104—Gear (Also referred to as "wheel gear")
105—Button
FIG. 5: Is a bottom view of the tuner of the disclosure with the worm in the engaged position.
501—Screw hole to affix tuner to instrument
FIG. 6: Is a bottom view of the tuner of the disclosure with the worm in the disengaged position.

FIG. 7: Is a bottom view of the tuner of the disclosure with the worm in the engaged position with reference to:
701—Worm pushing spring.

FIG. 8: Is a bottom view of the tuner of the disclosure in the left side version.

2601—Allen key

Figure 27:
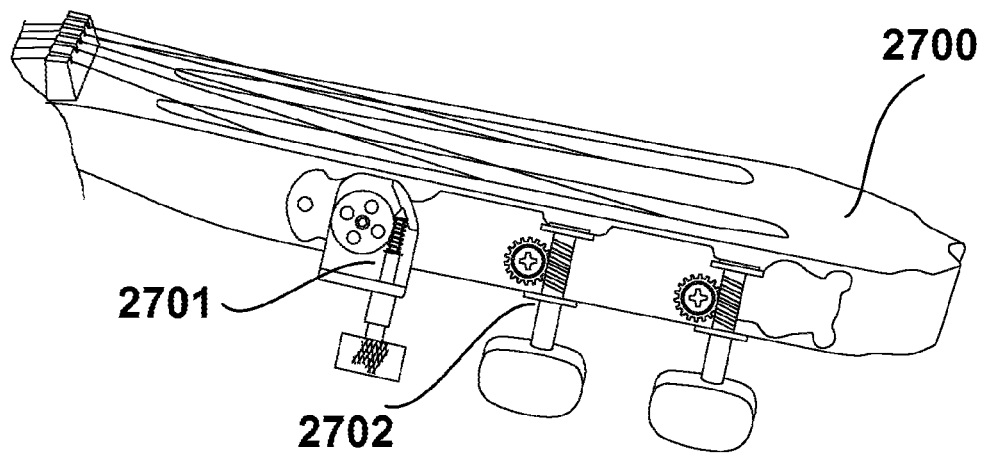

FIG. 27: Is the tuner of the disclosure applied to a classical guitar.

2700—Classical guitar peg head
2701—One of the tuners of the disclosure
2702—Prior art classical guitar tuner FIG. 28: Side view of a compact six straight tuners arrangement.

2800—Upper tuner mounting plate
2800A—Lower tuner mounting plate
2801—Threaded spacers
2801A—Threaded spacers crews
2802—Stud
300D—Grooved deflecting surface
303A—Gear
304A—Modified shaft
305—String
307A—Bushing
310A—Modified gear-shaft attaching screw
2803—Bushing holding screws
2804—Mounting screws
2805—Metallic thread insert
2806—Neck
2807—Nut FIG. 29: Bottom view of the lower level of a compact six straight tuners arrangement.

FIG. 30: Side view of a compact six straight tuners arrangement where the spacers use the screws holding the bushings.

3001—Spacers

FIG. 31: Top view of the six straight tuners arrangement.

Figure 32:
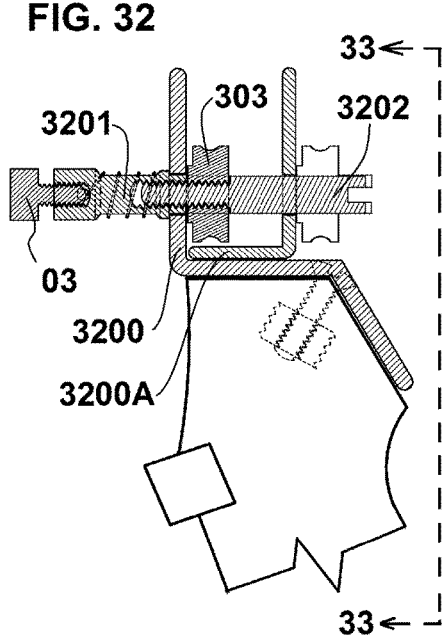

FIG. 32: Side view of a six angled tuners arrangement showing a cross-sectional view of an upper level tuner.

Figure 33:
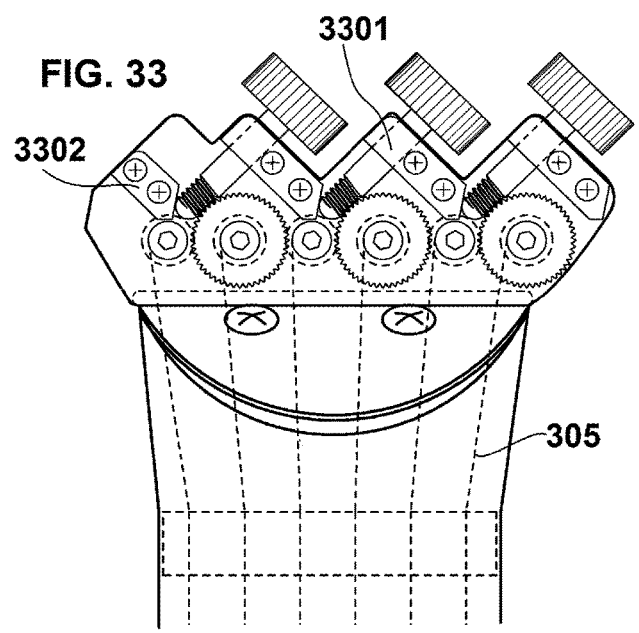

3201—Upper tuner shaft
3202—Upper tuner backwards shaft extension
3203—String retaining screw.
3200—Upper tuners mounting plate for angled tuners
3200A—Bottom angled tuners mounting plate FIG. 33: Bottom view of the lower level of a compact six angled tuners arrangement.

3301—Combined bushing and deflector
3302—End tuner deflector

Figure 34:
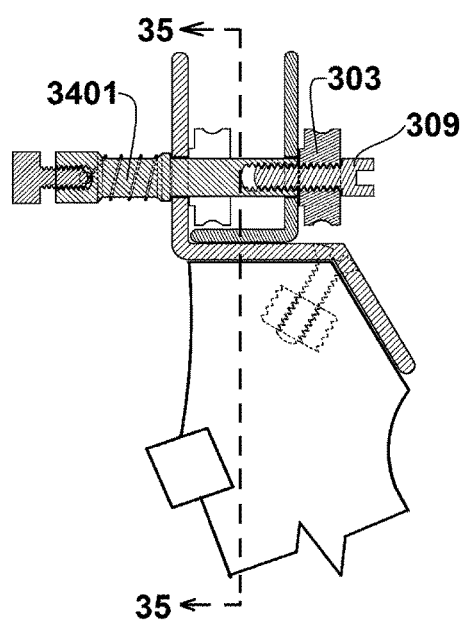

FIG. 34: Side view of a six angled tuners arrangement showing a cross-sectional view of a lower level tuner.

3401—Modified shaft

Figure 35:
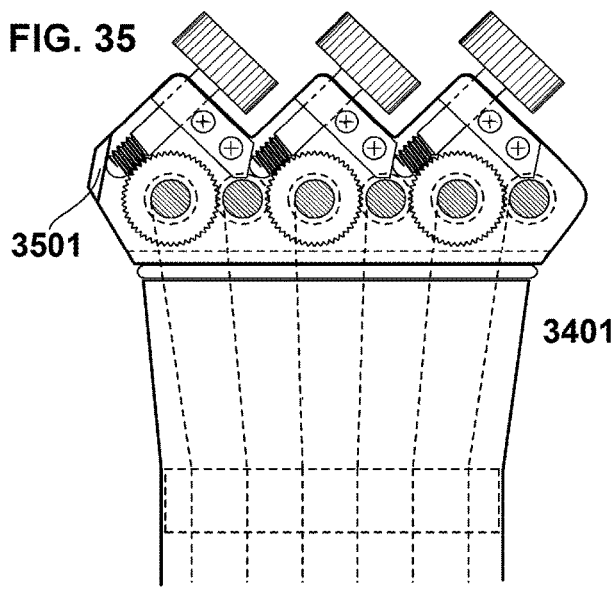

FIG. 35: Sectional view showing the upper level of tuners on a compact six angled tuners arrangement.

3501—End tuner deflector

Figure 35A:
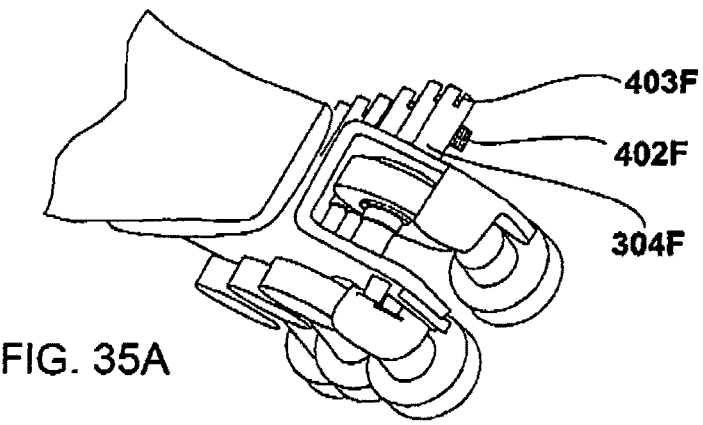

FIG. 35A: Perspective view of a compact six angled tuners arrangement.

Figure 36:
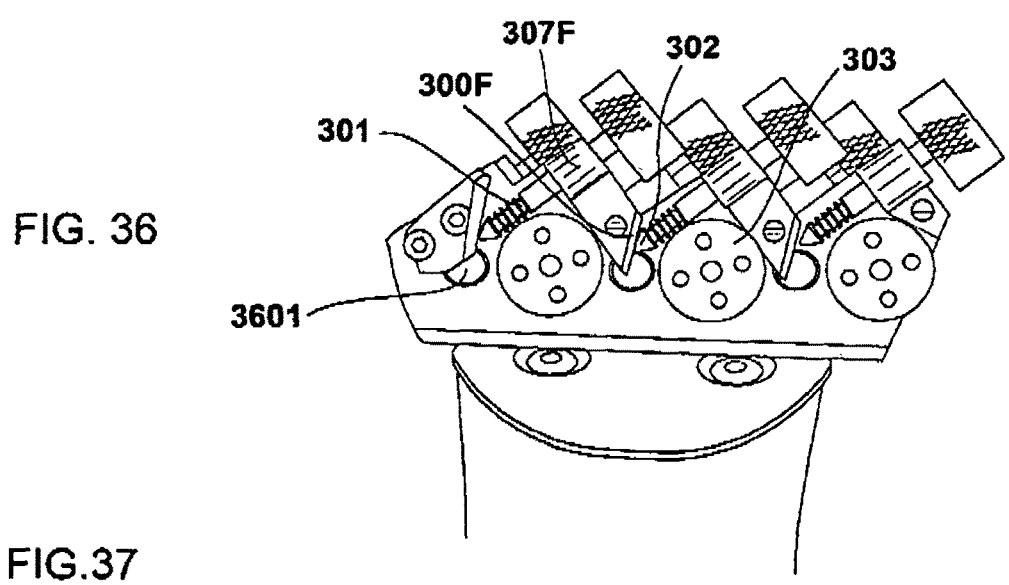

403F—Driver tool engaging slots
402F—String retaining screw
304F—Upper portion of shaft FIG. 36: Bottom view of a compact six angled tuners arrangement.

3601—Upper level tuner shaft ends
300E—Deflecting surface
307F—First worm bearing bushing.

Figure 37:
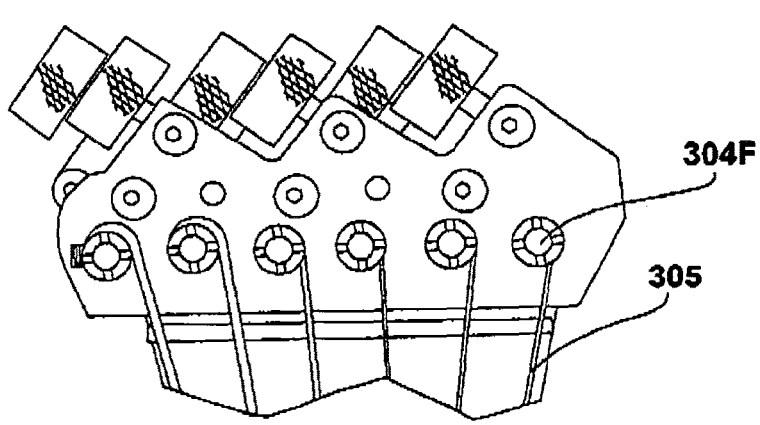

FIG. 37: Top view of a compact six angled tuners arrangement.

FIG. 38: Central section of a string retaining (or locking) system using an axially oriented screw.

304E—Upper portion of shaft

401E—String threading hole
402E—Screw
3801—Female thread

FIG. 39: Central section of a string retaining (or locking) system using a radially oriented screw.

304F—Upper portion of shaft
401F—String threading hole
402E—Screw
3901—Axial female thread FIG. 40: String clipping system details.

304G—Upper portion of shaft
4000—Spring
4001—Bottom contact point
4002—Upper contact point
4003—Hook
4004—Hole
4005—String clipping slot
4006—Sideways opening on string clipping slot FIG. 41: String clipping system unloaded.

FIG. 42: String clipping system clipping a string.

DETAILED DESCRIPTION OF THE DISCLOSURE

The scope of the disclosure is not limited by the embodiments described herein. There may be an unlimited number of embodiments and variations having different properties and features that do not affect the basic operation of the mechanism (including but not limited to: size, relative dimensioning of the components, use of different materials and/or different manufacturing methods, adding ornaments of esthetic oriented components and parts like covers of any shape and method of attaching them, using ornamented surfaces having different finishing and colorings, reshaping components (for example using knobs, buttons, or other components having shapes, colors or other properties that differ from the ones shown, using different techniques to attach the gear to the shaft and/or the worm to the button or knob, etc.), that do not depart from the essence and spirit of the disclosure.

The following comments, analysis and figures refer to a machine head on a guitar but the disclosure is applicable to any worm drive requiring precise angular positioning of the shaft, and to any stringed instrument having any number of strings.

Most of the descriptions and figures refer to an embodiment that uses a deflecting surface with no second bearing for the worm, but the analysis and comments apply to the embodiments that use a second articulate bearing as well.

The words "bottom", "top", "horizontal", "vertical", "up", "down", "forward" and "backwards" refer to the orientation of a machine head on a typical device with strings, for example a stringed instrument with its top and strings facing upwards. "Gear" refers to the wheel gear component on a worm drive, while "worm" refers to the elongated gear with an helical tooth that meshes with the worm wheel or gear in a worm drive mechanism.

Machine heads based on the worm drive mechanism have been in use by musicians since the early 1800s. In accordance with the disclosure, they present a number of shortcomings, including:

Backlash: an uneven response (dead spot, or unwanted step) in the pitch change when switching the direction of the rotation of the worm, mostly due to gear teeth play and end play (axial worm play) and in most cases makes the tuning of the string possible only in the "tune up" direction of rotation since the "tune down" direction leads to unstable tuning, degrading the efficiency and accuracy of the process.

Low gear ratios limiting the accuracy of the tuning process. Normal types have 1:14 ratio on guitar machine heads, high end types may have up to 1:21. Higher ratios can be obtained using special materials at much higher cost, problems the disclosure solves, enabling even higher ratios.

Difficult string replacement: At 1:14 gear ratio, it takes 70 turns to wind a string the average of 5 turns required to anchor it to the string post. Since most buttons are flat, it is a trying task for the player's wrist, and this number has to be multiplied by 6 to fully re-string a guitar. Most musicians delay or avoid this chore, with the result that they play too often with old strings, to the detriment of the tone of the instrument and the quality of the music. There are cranking devices on the market allowing a faster winding of the strings, but they solve only part of the problem since the user still has to turn it about 420 times for a string set replacement and it makes an additional piece of equipment to look after or carry around.

Worsening performance with wear: The problems related to the play between the parts become worse with time because of surface wear of the parts and consequent increase of the play between the critical components.

Linear (Nut and Screw) Tuners

In nut-and-screw tuners, used among others on Steinberger and Portuguese guitars (Steinberger U.S. Ser. No. 04/608,904) the string is tensioned by attaching it to a rotationally stationary nut which is linearly moved by the turning of an axially stationary screw (also the nut can be axially stationary and the string attached to an axially movable screw), but the inventor of the instant disclosure has found that they have a short range, limited by the available length of the screw, and a problematic anchoring of the string, leading to the use of special strings having a ball on each end. They have a clear advantage in quality over other prior art methods due to smoothness, good resolution (akin to a gear ratio of 1:40) and lack of backlash, making the reaching of the target pitch much easier and precise, but these tuners have not been widely adopted.

The inventor has found the worm drives described are hyperstatic, since the two fixed bushings (xxx) and (xxy) determine univocally the position and balance of the worm except for its rotation around its axis, hence the force at its point of contact with the gear is impossible to calculate according to the physical laws of equilibrium and will depend on manufacturing parameters. Likewise, if a leg is added to an already balanced, loaded three legged table, the force acting on the fourth leg cannot be calculated, and can vary from zero to near all the load depending on its exact position, length, angle, and deformability of the materials The instant disclosure overcomes the limitations of the prior art, as described herein.

Referring now to the figures, for the worm drive of this disclosure (FIGS. 3 and 4) the tip of the worm (302) is not mounted on a stationary bushing, but it is able to move within a path that takes the worm closer to the gear (303) as it moves forward under the pull of the string (305) transmitted by the gear's teeth, either by resting on a bearing mounted on a motion restricting mechanism, or by making the tip of the worm rest against a surface (300) that keeps it in such a path. In both cases the reaction forces that are created have components that push the worm (301) and gear (303) together, ensuring a tight mesh.

The remaining fixed bushing (307) must allow some degree of free motion (FIG. 10) to the worm (301) so that it can yield to the forces pushing it forward and towards the gear without generating internal stress.

The force pushing the worm towards the gear depends on the angle between the reaction forces and the axis of the worm. Since said angle depends on the geometrical path that the tip of the worm is forced to follow, the forces that operate within the system can be controlled by changing the geometry of the components and can be calculated, since the structure is now isostatic, because now the worm would be loose if the gear was removed.

The worm and the gear are pushed together as an effect of the string tension, which has always the same direction (unlike the friction forces on a regular machine head), so the meshing between worm and gear is always tight and has zero play like the nut and screw on a linear tuner, having the same advantage of absence of backlash because the working surfaces are constantly pressed together with a force that is essentially independent from the direction of the turning of the worm.

Higher Gear Ratios

In a traditional machine head the teeth of the worm and gear are rectangular or at best trapezoid, and the force between the teeth created by the string tension can only be parallel to the axis of the worm, subjecting the teeth to bending stress which limits their minimum size, limiting the gear ratio. If triangular teeth were to be used, the inclined surfaces would generate separating forces having to be counteract by the structure which, being deformable, would be unable to keep the teeth in mesh beyond a certain reduction in size. Also, all frictions would be increased because of the increment of the internal stresses, further degrading the performance.

In the present disclosure the force between the teeth is oblique and able to increase with load, allowing the gear and worm to have triangular teeth with the force still acting nearly perpendicular to the contact area of the teeth, so no separating force component is created and the teeth operate mainly under compressive stress, which makes them much more robust, allowing the miniaturization of the teeth to the extreme and making possible very high gear ratios, which dramatically improves the tuning process. The tuners of this disclosure have been tested to gear ratios up to 1:100 at the date of this application using gears made from low tensile strength steel, still resulting in a safety factor greater than 4:1. Thus gears of the disclosure can operate from 1:10 to substantially greater than 1:150, for example greater than 1:40 up to 1:100.

The buttons (graspable tuning keys) used in traditional machine heads are shaped like paddles to allow the fingers to apply the high torque which is a consequence of the limited gear ratios, compromising the accuracy of the tuning. Also the random angle of the button forces the user to place his or her fingers in ever changing positions, generally not the most comfortable for best results.

The present disclosure enables the minimization of the friction forces due to the ability for looseness of the parts and the low torque at the worm which is a consequence of the high gear ratios making possible the use of round knobs allowing to position the fingers always at an optimal angle, and making the process so smooth that the knobs can be turned even with a single finger.

Disengaging the Gears

Since the worm has a moving end and its only fixed bearing does not have a tight fit, it is easy to disengage it from the gear even under load using a simple tool like a screw driver, a coin, or any flat object (or even the bare fingers, as explained below) to turn the shaft directly against the pull of the string which will simply cause the worm to be pushed out of mesh with the gear. The shaft can then be turned, allowing direct winding or unwinding of the string using the same tool, object or fingers before re-engaging the worm by pushing it back in mesh with the gear. This creates a sort of two-step tuning, with a coarse tuning achieved by winding the string by direct turning of the shaft, and a very precise fine tuning by turning the knob.

Self Adjustment

The other significant advantage of the present disclosure is that the working surfaces are pushed together and kept in position not by their exact positioning at the manufacturing stage, but by the forces generated by the tension of the string, so tolerances and wearing have no effect on the fitting of the parts.

The Gear as a Nut

The worm drive of the disclosure can operate advantageously with teeth being shaped as the internal section of a toroidal female thread, which allows the use of thread making tools to manufacture the gears and the use of standard screws of the corresponding size to manufacturing the worms, thus reducing manufacturing costs.
combined with the pressing force that is linearly dependent on the string tension, creates the equivalent to a continuous nut in which the worm is threaded and under load, hence having absence of backlash, smoothness and independency from tolerances and wear.

First Embodiment

Figure 1:
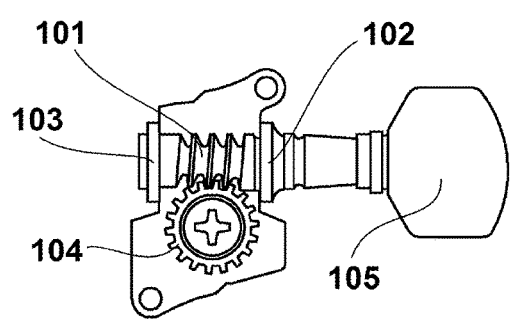
FIG. 1: Is a prior art machine head viewed from the bottom with the following references.
Figure 2:
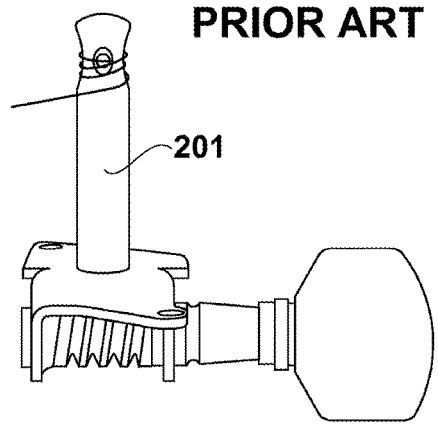
FIG. 2: Is the side view of the machine head of FIG. 1 with the following references:
201—Shaft
202—String
Figure 3:
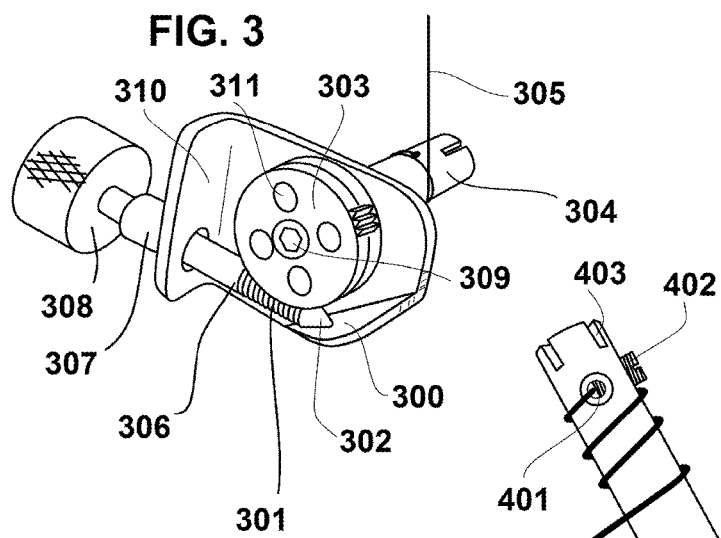
FIG. 3: is a perspective view of the first embodiment of the tuner of the present invention viewed from the bottom with references to:
300—Thrust surface (also referred to as "deflecting surface" or "deflector")
301—Worm
302—Second bearing of the worm
303—Gear wheel (also referred to as "gear")
304—Shaft affixed to the gear wheel
305—String
306—Shaft of worm extending beyond the thread.
307—Bushing and first bearing of the worm
308—Knob
309—Screw attaching the gear to its shaft.
310—Frame
311—Driver tool engaging holes

As shown in FIG. 3, the torque created by tension of the string (305) would make the gear (303) turn counterclockwise if it was free to turn, but it is prevented to do so by its teeth meshing with the worm (301) which is stopped in its forward motion by surface (300), causing the worm (301) to be cornered between the gear (303) and surface (300), increasing the pressure between these parts as the string (305) tension increases.

Figure 9:
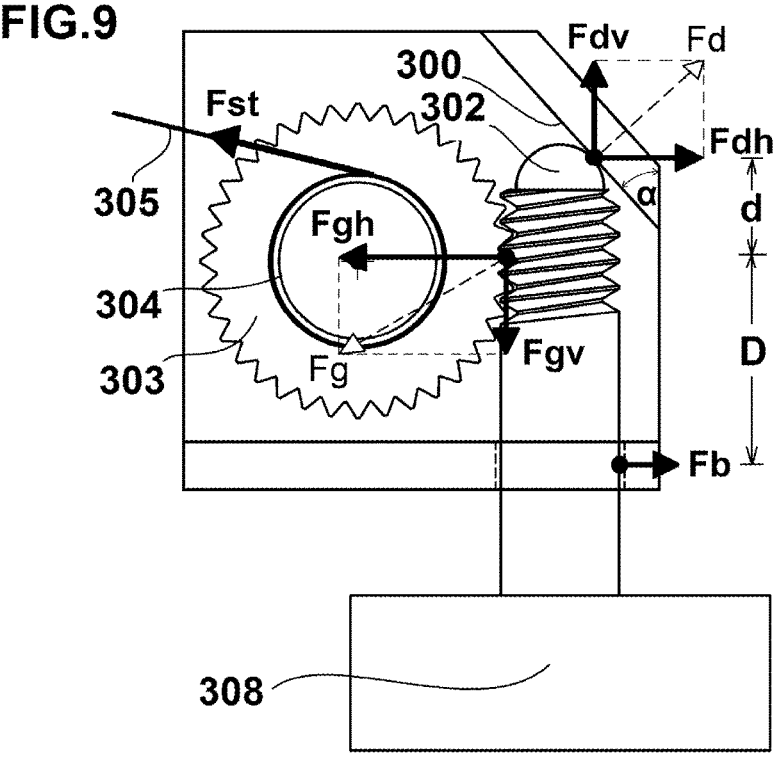
FIG. 9: Is the analysis of the forces in play on the tuner of the disclosure, where Fg: Is the force applied to the gear by the worm showing its vertical and horizontal components;
Fd: Is the force applied by the worm to the deflecting surface;
Fst: Is the load applied by the string;
Fb: Is the force applied at the first bearing.

FIG. 9 Shows the main acting forces. There are also friction forces present but either they operate in directions that make them irrelevant (like the friction between the straight portion of the worm and the sleeve) and/or they can and should be minimized by using hard materials and polished surfaces, like the friction between the worm and the deflector.

The analysis of the forces as illustrated on FIG. 9 leads to the following expression for the force at the point of contact between worm and gear:

$$Fgh = Fst \times (r/R) \times (1+d/D)/tg\alpha$$

Where:
Fgh is the component of the force between the worm and the gear which is perpendicular to the axis of the worm, so it constitutes the meshing force,
Fst is the tension of the string,
r is the radius of the shaft,
R is the radius of the gear,
d is the distance to the point of contact with the deflecting surface.
D is the distance to the fixed bearing contact point
α is the angle of the deflecting surface with the axis of the worm.

This expression shows that the force that pushes the worm towards the gear is in direct proportion to the tension of the string Fst, in inverse proportion to the tangent of the angle α, (so the smaller the angle, the stronger the force) and also a function of other dimensional parameters, proving that is possible to control this force by modifying the geometry of the setup.

The holes (311) on the gear are for the purpose of applying torque with a special driver to tighten the screw that attaches it to the shaft (304). They are not necessary if a different type of attachment is used in other embodiments of the disclosure.

The tip of the worm (302) rests against the deflector (300) and is terminated in a cone point to reduce the torque created by its friction with the deflector as it turns, but it can have other shapes.

A knob (308) is used to apply manual torque to the worm. In other embodiments it can have other shapes and be replaced by or combined with devices that turn the worm using a manual driver tool or a mechanical, electrical or electromechanical driver or combination thereof able to tune the strings automatically or/and for other purposes like altering the tuning of the instrument.

The deflecting surface on this embodiment was created by bending the corner of frame (310) This surface does not need to extend beyond the play of the worm's tip which ideally should be zero, but in practice may exist as a consequence of the tolerance of other parts, like an imperfect link between the gear and the shaft which would make the gear wobble as it turns, and since the worm's axis should follow the center line of the gear's teeth because of their concave shape (see FIG. 11), this will cause the tip of the worm to oscillate. Other sources of play can be imperfect centering and/or roundness of the gear, imperfect straightness of the worm, etc.

Even if these manufacturing imperfections are present, their effect is limited either to an unevenness of the apparent gear ratio or second order backlash, with no noticeable impact in the quality of the tuning process. The same level of imperfection would have much greater impact on a regular machine head, in some cases to the point of rendering it inoperable as it would be the case for any significant excentricity of the gear, the worm, or the shaft, which would create internal stresses that could lock the mechanism, since the position of the components is fixed.

The deflector (300) may be subjected to significant stress so it is important that it be made rigid, and hard enough not to be penetrated by a worm's cone point. It does not have to be flat, as other shapes may be as efficient and may be more cost effective than the one shown in this embodiment. The same structural requirements apply if a configuration other than a deflecting surface is used to produce the meshing force.

The fixed bushing (307) has a sleeve that works as a guide for the worm when it is pulled out of mesh with the gear. The mechanism can operate without this component, with the worm straight section crossing a simple hole on the frame, but the worm will tend to go out of alignment when pulled out, making the operation somewhat uncomfortable.

Figure 4:
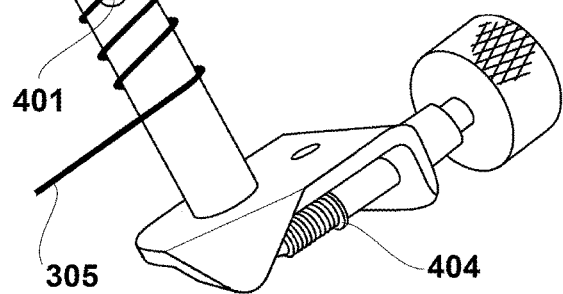
FIG. 4: Is a side view of the first embodiment of the tuner of the disclosure with references to:
401—String threading hole
402—String retaining screw
403—Slots to connect a driver tool
404—C clip

FIG. 4: Is a perspective from the side, where:
(401) Is the string threading hole on the string post.
(402) Is a screw transverse to the string threading hole to lock the string in order to secure it against slippage. It protrudes from the shaft for the purpose of the illustration, but this protrusion is neither necessary nor desirable, and can be eliminated by the use of shorter screws. The screw can have a headless socket or any head or combination thereof that will fit in the available space, or it can be mounted from the top of the shaft as explained further below.

Slots (403) at the top of the shaft allow it to be turned using a driver. Two slots at 90 Deg. can receive a flat or a Philips screwdriver, a coin, or any other flat object allowing the fingers to apply enough torque to bring the string close to its target pitch.

Figure 10:
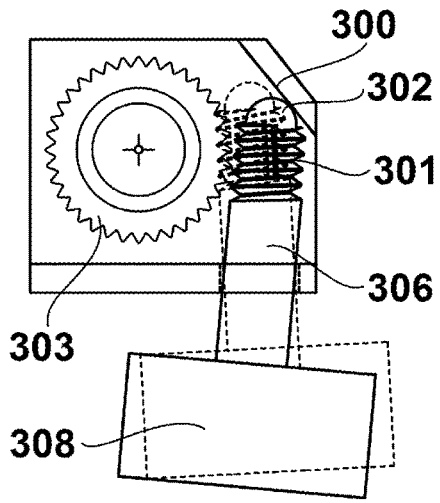
FIG. 10: Is a bottom view of the tuner of the disclosure showing the play of the worm inside its first bearing.

FIG. 10: Shows the play of the worm on its fixed bearing. With no play there would be internal stresses that would interfere with the proper operation. It also shows an example of the tip of the worm being of a different shape than cone point. This round (or any other cylindrical shape) may be useful to increase the friction torque if the torque necessary to turn the knob is so low because of the high gear ratio that the knob turns too easily. It is also shown that the play on the worm bearing may be such that the worm can be disengaged from the gear with a sideways movement of the knob without having to pull it backwards.

FIG. 5: Is a view from the bottom of the embodiment of FIG. 3 showing the gears in the mesh position. The arrow indicates the movement of the knob to engage the gears.

FIG. 6: Is the same view as FIG. 5 with the worm disengaged from the gear. The straight arrow indicates the movement of the knob to disengage the gears. When the shaft is turned against the tension of the string as indicator by the rotating arrows, the gear teeth will push the worm out of mesh even if the knob is not pulled.

To turn the shaft in the direction of the pull of the string the worm must be disengaged from the gear first by turning the shaft against the pull of the string as explained above, then the worm is disengaged by pulling from the knob, after which it is possible to turn the shaft in either direction.

In this embodiment a C ring (404) is placed on the worm to limit its motion when it is moved out of mesh with the gear. This C ring is not necessary if the diameter of its gear section is significantly larger than the diameter of its straight section or if the user wants to be able to pull the worm completely out for whatever reason.

In this embodiment the shaft is attached to the gear by set screw (309) which axially threads through the gear and the shaft, its thread having an orientation as to increase its tightening with the load torque. This method of attaching these two components eliminates any play between them and is made possible by the worm drive of this disclosure being unidirectional, unable to receive loads in the direction in which the worm is free to slide out of mesh, meaning that the gear and the shaft cannot be untightened in normal use, and even if by accident they became loose, they would be re-tightened by just reapplying the load. It is also possible to use chemical and/or mechanical methods to make accidental untightening unlikely.

Other methods of attaching the gear and the shaft can be used, like the shaft having a polygonal shape at its bottom entering a corresponding polygonal opening on the gear, the whole kept tight by a screw axially crossing both members, but they are more expensive to manufacture and may introduce backlash due to play.

Other Embodiments

FIG. 7: Is an embodiment in which a spring (701) has been added to keep the worm spring-loaded towards the engaged position. This option makes the worm to be always in mesh with the gear except when the shaft is turned to wind the string, which pushes the worm out with the action of the spring pushing it back in mesh when the shaft is released. This simplifies the string replacement process. It also makes the worm a little too pushy, so its use may be a matter of personal choice, and it may be implemented as a dismountable option. The spring may have a variety of other shapes that will fulfill the same function.

Spring (701) can also be used to keep the gears in mesh in applications where there is no constant load, its stiffness tailored to the needs of the application.

FIG. 8: Is the symmetrical version of the first embodiment to be used on instruments having a peg head in which some of the machine heads are mounted on one side facing the ones installed on the opposite side in a split arrangement. Unlike traditional machine heads, which can wind the string in both directions of rotation of the shaft, the tuners of this disclosure are unidirectional. This figure shows that this is not an impediment for their use on both sides of a peg head. The sense of the tread of the screw joining the gear and the shaft needs to be reversed for the load to have a tightening torque, FIG. 14: Is an embodiment in which the reaction forces are produced by the worm pressing against a roller (1402) turning on a pin (1401) affixed to the frame instead of pressing against a fixed surface. The angle of the cone tip of the worm determines the relationships between the forces in play.

Figure 14:
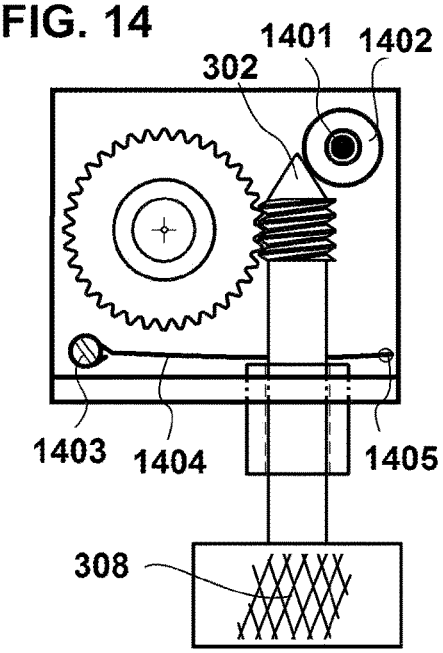
FIG. 14: Is a bottom view of the tuner of the disclosure where the deflector is created with a roller turning on a pin and using a sideways pushing spring.
1401—Pin
1402—Roller
1403—Holding loop and screw
1404—Spring
1405—Spring holding hole

It is also possible to use any fixed body having a surface where the tip of the worm can slide at a proper angle, like the cylindrical head of a screw threading into a threaded bore on the frame in lieu of the roller and pin shown on FIG. 14.

Also in FIG. 14 it is shown a way to spring-load the worm sideways using a spring (1404) made of steel wire having a loop (1403) at one end used to affix it to the frame with a screw or a rivet, while its other end is held by opening (1405) on the frame. The amount of pre-bending on the wire will determine the amount of friction acting on the worm that will prevent it from hanging loose when there is no load or when it is pulled out of mesh with the gear. This effect can also be obtained with a thin plate of various shapes, or by bending the steel wire in a variety of forms (which will allow to change the direction of the pressure, to make it push towards or away from the gear, etc) or by lining the sleeve with an elastic material like silicon rubber. The actual shape or materials to be used depends on cost, manufacturing factors, and the effect desired.

Figure 15:
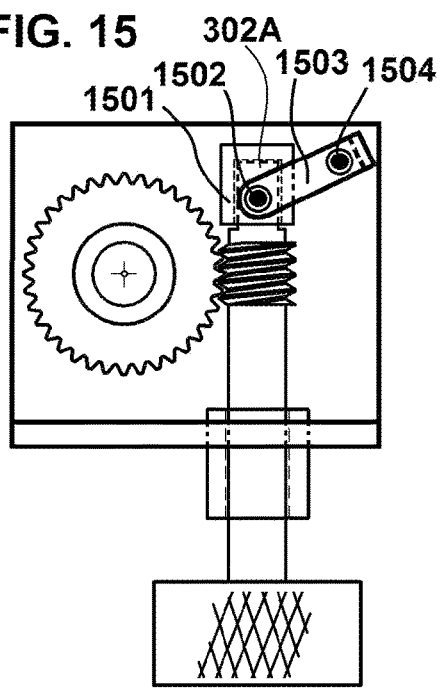
FIG. 15: Is a bottom view of the tuner of the disclosure having the second bearing of the worm rotatably mounted on a pivoting bushing mounted on an arm pivoting on a pin.
1501—Bushing
1502—Bushing pivoting pin
1503—Arm
1503—Arm pivoting pin
302A—Second worm bearing having a cylindrical shape.

FIG. 15: Shows an embodiment in which the reaction forces are produced by an arm (1503) pivoting on a pin (1504) and coupled to a bushing (1501) pivoting on pivot (1502). Bushing (1501) can only move within a geometrical path that generates the same reaction forces as the fixed surface of the first embodiment.

Unless the parts are made very rigid, to maintain the symmetry of the forces and avoid unwanted torques arm (1503) should have an upper and a lower portions of the same shape joined by a vertical portion shown in FIG. 15 as a dashed line close to pin (1504). Pin (1502) has an upper and a lower sections affixed to bushing (1501) engaging respectively the upper and lower portions of arm (1503)

Figure 16:
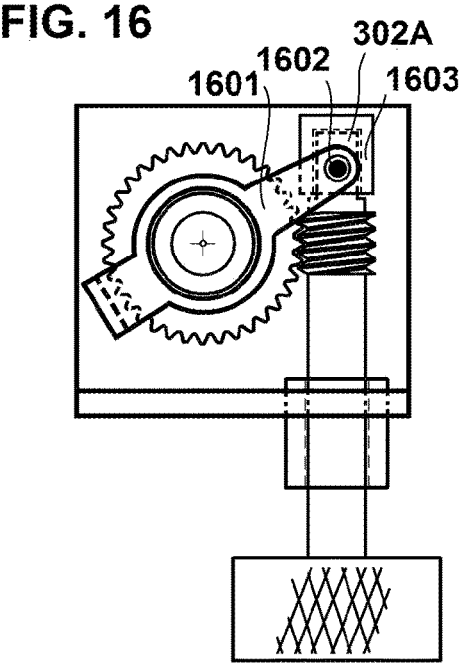
FIG. 16: Is a bottom view of the tuner of the disclosure having the second bearing of the worm rotatably mounted on a bushing pivoting on an arm pivoting on the gear's shaft.
1601—Arm pivoting on the gear's shaft
1602—Bushing pivoting pin
1603—Bushing

FIG. 16 Shows an embodiment in which the reaction forces are produced by an arm (1601) pivoting on the gear's shaft and a bushing (1603) pivoting on pin (1602). A variation of this embodiment has arm (1601) pivoting on a pin placed in a position other than the axis of the gear's shaft. The system should operate correctly as long as the pivot is positioned within the bottom-left quadrant from pivot (1602).

Figure 17:
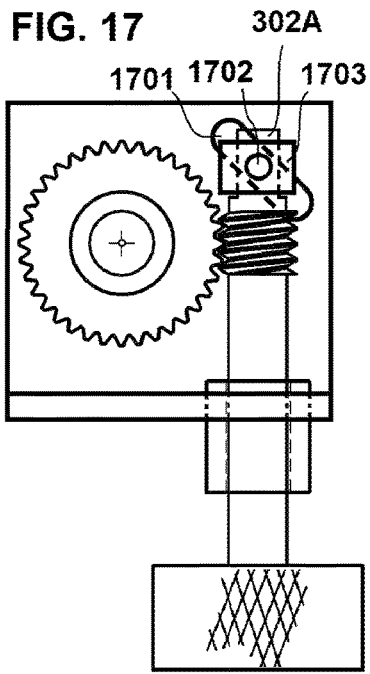
FIG. 17: Is a bottom view of the tuner of the disclosure having the second bearing of the worm pivoting on a bushing sliding inside a slot on the frame.
1701—Slot
1702—Bushing pivoting pin
1703—Bushing

FIG. 17: Shows an embodiment in which bushing (1703) is made to slide along guide (or rail) (1701) to which it is connected through pivot (1702). The same considerations about symmetry as in FIG. 11 apply, meaning that there should be an upper guide and a lower guide unless the parts are made very rigid. A variation of this embodiment uses a single guide or rail at the center with bushing (1703) attached to a post sliding inside the guide or rail.

Figure 18:
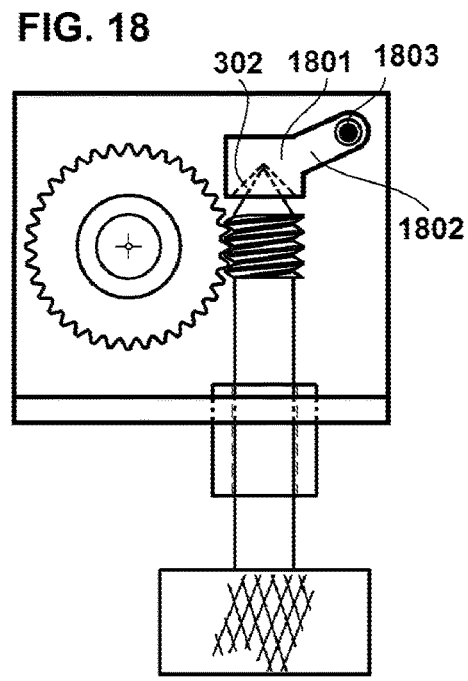
FIG. 18: Is a bottom view of the tuner of the disclosure having the second bearing of the worm rotatably mounted on a pointy conical cavity at the end of a pivoting arm.
1801—Pointy conic cavity
1802—Arm
1803—Arm pivoting pin

FIG. 18: Shows an embodiment in which an arm (1802) pivoting around pin (1803) has a bearing at its tip consisting of a conic cavity (1801) where the cone point of the worm is made to rest. The necessary free angular displacements between the arm and the worm are accommodated by the differential of the angle of the cones.

Figure 19:
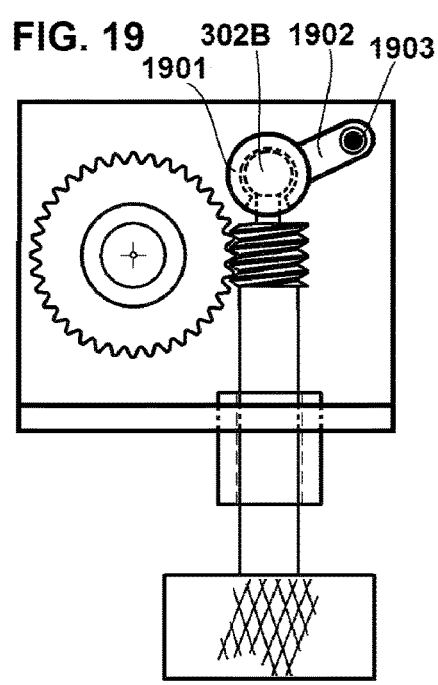
FIG. 19: Is a bottom view of the tuner of the disclosure having a ball and socket second bearing for the worm mounted on a pivoting arm.
302B—Ball shaped worm second bearing
1901—Spherical cavity
1902—Arm
1903—Arm pivoting pin

FIG. 19: Shows the same configuration of the embodiment of FIG. 18 where the bearing is a ball joint.

Figure 20:
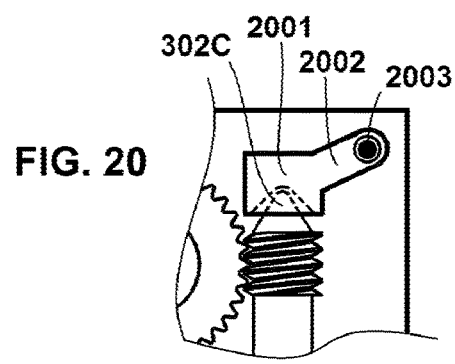
FIG. 20: Is a bottom view of the tuner of the disclosure having a second bearing for the worm rotatably mounted on the end of a pivoting arm having a rounded bottom conical cavity to receive the rounded tip of the worm.
320C—Rounded tip conical worm second bearing
2001—Rounded tip conical cavity
2002—Arm
2003—Arm pivoting pin

FIG. 20: Shows the same configuration of the embodiment of FIG. 18 where the cone tips are rounded.

Figure 21:
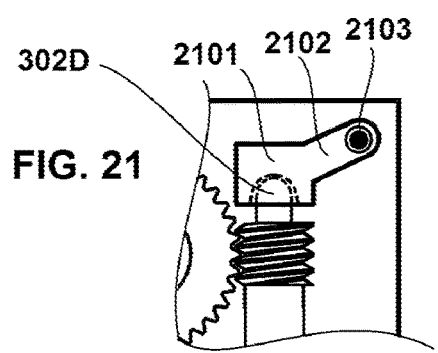
FIG. 21: Is a bottom view of the tuner of the disclosure having an hemispherical second bearing of the worm rotatably mounted on a hemispherical cavity at the end of a pivoting arm.
302D—Hemispherical tip worm second bearing
2101—Hemispherical cavity
2102—Arm
2103—Arm pivoting pin
Figure 22:
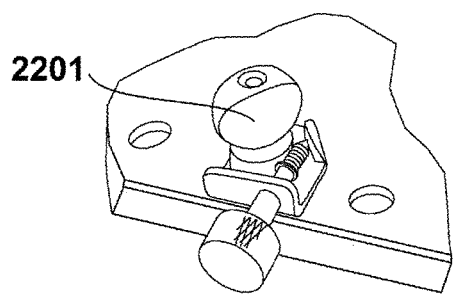
FIG. 22: Is the tuner of the disclosure having a button to turn the shaft to wind the string.
2201—Button attached to the shaft and gear
Figure 23:
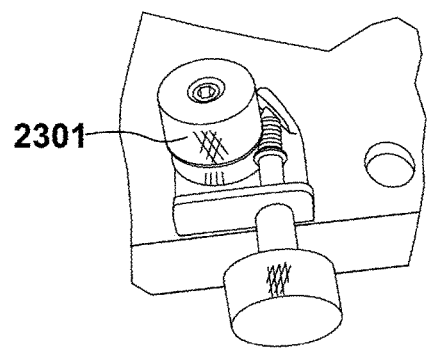
FIG. 23: Is the tuner of the disclosure having a knob to turn the shaft to wind the string.
2301—Knob attached to the shaft and gear
Figure 24:
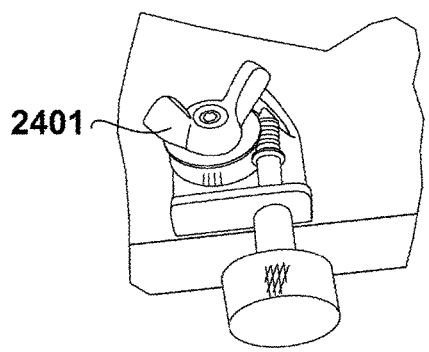
FIG. 24: Is the tuner of the disclosure having a wing nut or thumb screw to turn the shaft to wind the string.
2401—Winged manual driver attached to the shaft an gear.
Figure 25:
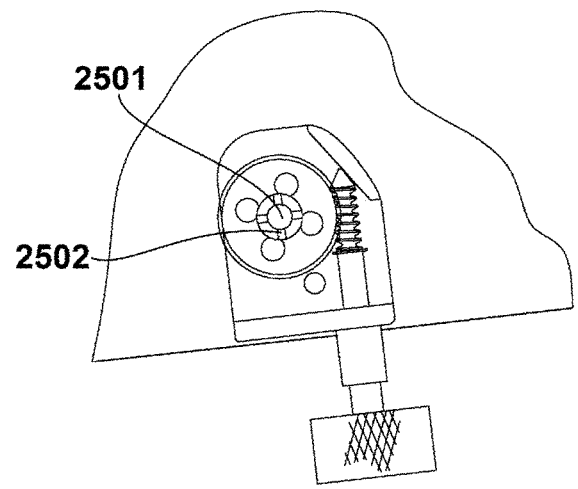
FIG. 25: Is the tuner of the disclosure having a hex socket screw head to turn the shaft to wind the string which also has slots to allow other drivers to be used.
2501—Hex socket head screw 2502—Slots machined on the head of the hex socket head screw

FIG. 21: Shows the same configuration of the embodiment of FIGS. 18 and 20 where the cones are replaced with hemispherical shapes.

In the above embodiments the pivoting points can be made with different techniques, like reversing the positions of the pins and the holes, or using knife types of pivoting points, etc., and other means may be used to force the tip of the worm to stay on a path that moves the worm closer to the gear as it moves forward, without departing from the essence and spirit of the disclosure.

Figure 13:
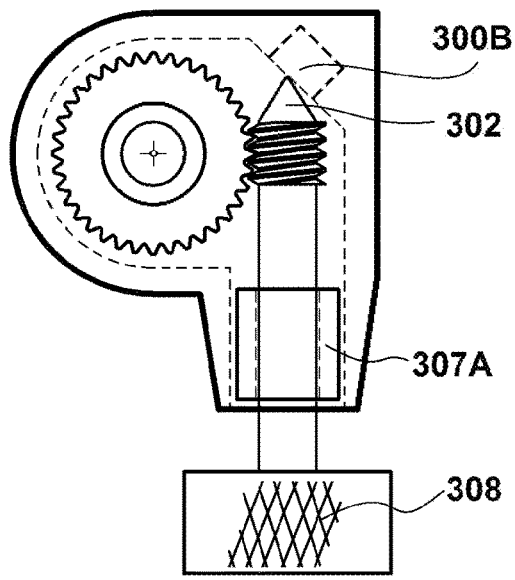
FIG. 13: Is the tuner of the disclosure in a closed type casing with reference to:
300B—Deflector created by a hard metal insert
307A—Bushing at first worm bearing that may be incorporated in the casing.

FIG. 13 Shows an embodiment that uses a closed type of molded casing where the deflector is molded into the casing and a hard metal insert is used at the contact point with the worm's tip if the metal used for the casing is not hard enough.

FIG. 27 Shows the application of the disclosure on a classical guitar with nylon or steel strings. The esthetic aspect may be improved in several ways, for example by using some kind of cover, and the tuners can be mounted in strips as the traditional ones are.

Addressing a Source of Second Order Backlash

Figure 11:
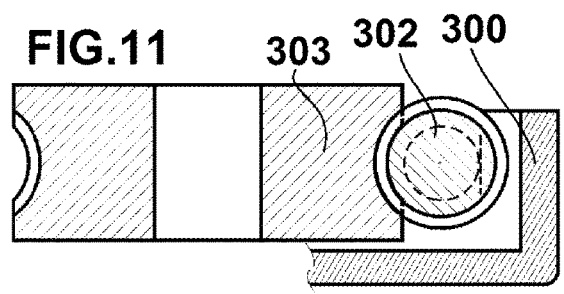
FIG. 11: Is a cross-sectional view of the gear, the worm and a flat deflector on the tuner of the disclosure.

FIG. 11: Is a sectional view of the gear, the worm and the deflector showing that the concave shape of the gear teeth will prevent vertical relative displacements between the worm an the gear when they are pressed together. This is necessary since the worm has transverse play.

The friction forces between the tip of the worm and the deflecting surface create the possibility of some vertical motion of the gear itself when the worm changes its sense of rotation due to the inevitable axial play of the gear on its bearings. This would appear as second order backlash during the tuning process since part of the rotation of the worm would be used to move the gear (which is kept aligned with the worm because of the concavity of its teeth) vertically instead of rotating it.

Figure 12:
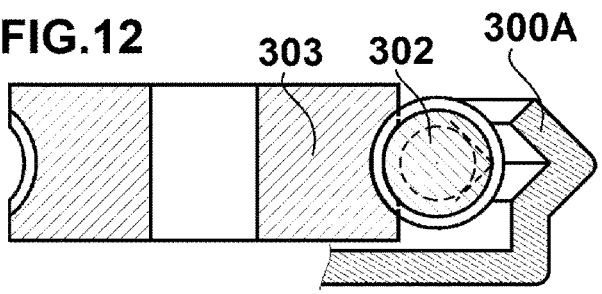
FIG. 12: Is a cross-sectional view of the gear, the worm and a deflector having a concave shape on the tuner of the disclosure.
300A—Concave shaped deflector

FIG. 12: Shows an embodiment that addresses the above mentioned problem. The deflector prevents the vertical movement of the worm by having oblique sides (or a concave shape) keeping the worm's tip vertically fixed, so any axial play of the gear is eliminated as a possible source of backlash. Any shape of the deflector that prevents vertical motion of the tip of the worm (like a groove for a cone point of the worm) will have the same effect. The actual shape to be used depends on cost and manufacturing factors.

Figure 26:
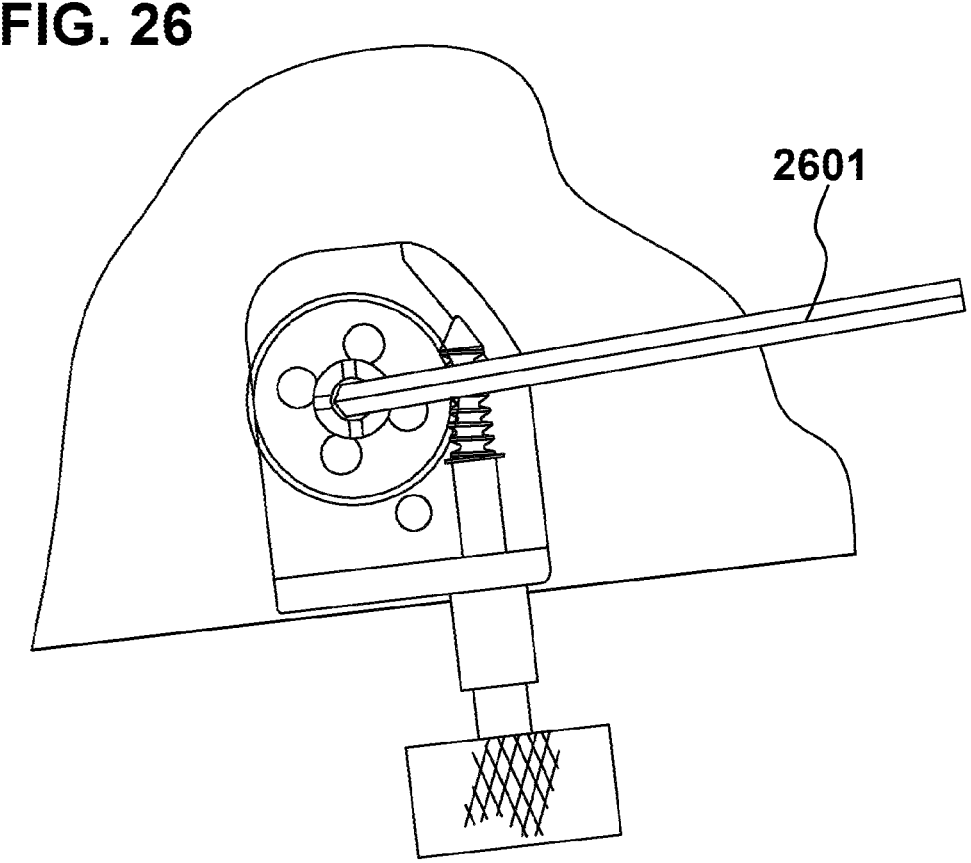
FIG. 26: Is the tuner of the disclosure having a hex socket head screw to turn the shaft with an Allen key inserted.

FIGS. 22 to 25 show the tuner installed on a guitar peg head with the addition respectively of a button (2201), a knob (2301), a wing nut or thumb screw (2401) and a hex socket head (2501) attached to the gear, allowing the winding of the string with the bare fingers or with an Allen key as shown on FIG. 26. These are examples of drivers that can be used on the back of the tuner that would render unnecessary the slots at the top of the shaft (403) in FIG. 4. FIG. 27 Shows also that it is possible to have slots cut on the hex socket head and still be able to use an Allen wrench, which is more comfortable to turn the shaft. Although the slots weaken the hex socket, the torques required to wind the strings are much lower than those for which the socket is designed, making this operation possible. This is desirable, because even though Allen wrenches are easy on the hands, they are easy to misplace too, so this configuration retains the possibility of using other tools in case of unavailability of the Allen wrench. Also, there could be only one slot made instead of two, to retain more strength on the modified socket head.

FIGS. 28 to 31 show an embodiment on a headless guitar in which all six tuners are made to fit at the end of the neck (2806). They are installed on two metal plates (2800 and 2800A) fastened or welded together, and arranged in two levels of three tuners each. The deflectors are created with studs (2802) with the deflecting angle defined by the angle on the cone tip of the worms, which slide inside grooves (300D) carved around the studs *(2802) to prevent any vertical displacements.

Spacers (2801) join the edge of the plates to add rigidity to the setup. FIGS. 28 and 29 show two spacers (2801) attached with screws (2801A). The bushings (307A) are made from solid, machined material and attached with screws (2803)

The lower tuners have shafts (304A) that extend past the upper plate to reach the strings, while the upper tuners have bottom extending shafts that cross the lower plate to make possible turning the shafts from bottom tool engaging devices and to offer a higher resistant torque to the tilting pull of the strings. A more detailed description of the configuration of the shafts is given in FIGS. 32 and 34

On FIG. 29 the tuners of the lower level are visible from the bottom, showing that all the shafts can be directly driven from the bottom through screw heads (310A). It also shows that screws (2804) can be removed and the tuners dismounted as a block, which can be a very useful feature on foldable or dismountable travel guitars.

FIG. 30 shows an alternative way of mounting the spacers (3001) which uses screws (2803A), the same screws holding the bushings. This allows the use of six spacers, increasing rigidity even further.

FIG. 31 shows the tuner assembly from the top. It is seen that in order to keep the strings evenly spaced, the shafts must wind the strings in alternated opposited directions of rotation, which means that the lower and upper tuners must have opposite hand threads.

FIGS. 32 to 34A show an embodiment similar to the one on FIGS. 28 to 31 but in which the tuners are arranged at an angle. This has the advantage of a better ergonomics and frees more space between the gears, allowing higher gear ratios.

On FIG. 32 it is shown the detail of the shaft configuration of the upper row of tuners with shaft extensions (3202) crossing the lower plate, allowing the use of a tool to turn the shaft from the bottom, which frees the top of the shafts, allowing the use of axial string locking screws (3203), engaging the shafts (3201) to lock the string.

FIG. 33 is a view of the tuner block from the back. Members (3301) function as both bushings and deflectors, are made from solid stock and fastened to the plates. Member (3302) is a deflector only at the end of the row.

FIG. 34 shows the details of the lower tuners shafts (3401). The gear (303) and screw (309) can be the same as on a standard tuner.

FIG. 35 is a sectional view showing the upper tuners from the bottom. The deflector (3501) of the last tuner in the row is created by bending the edge of plate (3200).

FIG. 35A is a perspective view of another embodiment of an angled six tuner assembly.

FIG. 36 is a rear view of the assembly of FIG. 35A, where it can be seen that the bushings (307F) and the deflectors (300F) are again incorporated on a single component but manufactured by stamping rather than machining.

In this embodiment the lower end of the shafts (3601) of the upper tuners do not project beyond the lower plate, so slots are used at the upper end of the shafts (304F) to turn the shafts, and the string locking screws (402F) must be positioned transverse to the shafts.

FIG. 37 is a top view of the embodiment of FIG. 35A showing the top of the shafts (304F) and the strings (305).

String Locking Device

FIG. 38: Is a string locking device similar to the one shown in FIG. 4 except that the locking screw can be positioned at the top of the shaft rather than on the side, so that it is easier to use since it can be accessed from any angle. Although a set screw is shown, the system can use any type of screw, in particular thumb screws that do not require tools and are easy to operate when mounted from the top of the shaft.

The string (305) crosses hole (401E), screw (402E) engages female thread (3801) on shaft (304E) and is tightened until it presses against the string, capturing and securing it.

FIG. 39 is the string locking device having the screw in a direction transverse to the axis of the shaft.

The string (305) crosses hole (401F), screw (402F) engages female thread (3901) on shaft (304F) and is tightened until it presses against the string, capturing and securing it.

String Clipping Device

FIGS. 40 to 42 Show a string clipping device to secure the string in a way that is simple to use and prevents the slippage that occurs when installing new strings. It uses a slot at the top of the string post and a spring inside a hollow section of the shaft that clips the string and prevents it from sliding out as it is often the case when using just a threading hole. FIG. 40 shows one possible shape of the spring (FIGS. 41 and 42 show an extension of the upper end of the spring for the sole purpose of making its operation visible).

In this embodiment the clipping spring is made of wire and shaped in such a way as to have at least three points that press against the inside of the hollow shaft (304G) wall. The upper point (4002) is where the string will be held and is at the level of the lower part of the slot. In this section the spring (4000) is essentially parallel to the wall or it can be curved towards the center as it descends to better clip the string. On top of it there is a section that curves towards the center of the cylindrical opening to end at about the end of the shaft at or near the center of the circle. The wire spring (4000) is bent by 180 Deg. at its lower point (4001) and presses against the inside of the wall in the same direction as the upper one. The middle point is at about its center where the other end of the wire is sharply bent outwards to be inserted into a retaining hole (4004) that holds the spring axially on a plane perpendicular to the string inserting slot (4005), and where it presses the wall in a direction opposite to the other two contact points (4001) and (4002). The retaining hole (4004) does not need to be accessed by the user except for repairs, so it can stay in the section of the shaft that remains below the surface of the peg head.

The stiffness of the spring is a function of the thickness of the wire of which it is made, the length of the spring, the position of the retaining hole, any additional loops that can be added to improve its elasticity, and also the diameter of the cylindrical opening on the shaft (304G). To improve the vertical clipping capability of the device, a sideways opening (4006) can be made at the bottom of slot (4005) for the string to be pushed into it by the spring.

What is claimed is:

1. A device to adjust a string tension, comprising:
a worm drive including a worm and a worm wheel;
a first bearing on a first side of the worm;
a second bearing on a second side of the worm opposite to the first side of the worm; and
a thrust surface contacting the worm and mounted relative to the worm wheel, the second bearing operatively associated with the thrust surface so that the thrust surface urges the worm and worm wheel closer together when the worm wheel is under load.

2. The device of claim 1, wherein the worm drive is axially displaceable.

3. The device of claim 2, wherein the second bearing and the thrust surface are slidable relative to each other as the worm is rotated and displaced axially.

4. The device of claim 2, wherein the worm is displaced axially as the worm wheel applies a load to the worm.

5. The device of claim 1, wherein the worm and the worm wheel have mating teeth that are substantially triangular in profile.

6. The device of claim 1, wherein the worm wheel includes threads that are concave.

7. The device of claim 1, wherein the worm wheel includes threads that form a section of a toroidal shape.

8. The device of claim 1, wherein the worm is sufficiently axially displaceable to be slid out of mating engagement with the worm wheel.

9. The device of claim 1, further including a tool engagement connected to the worm wheel, the engagement coaxial with a rotational axis of the worm wheel, the tool engagement thereby configured to rotate the worm wheel when the tool engagement is driven by a mating tool.

10. The device of claim 1, wherein the thrust surface forms a non-orthogonal angle relative to a longitudinal axis of the worm and wherein the second bearing and the thrust surface form mating angled ramps.

11. The device of claim 1, further including a tool engagement affixed to the worm wheel, the engagement coaxial with a rotational axis of the worm wheel, the tool engagement thereby configured to rotate the worm wheel when the tool engagement is driven by a mating tool.

12. The device of claim 1, further including a biasing member to urge the second bearing against the thrust surface.

13. The device of claim 1, further including a biasing member positioned to bias the worm radially with respect to the axis of rotation of the worm, against the first bearing.

14. The device of claim 1, the thrust surface including forming a concave shape sized and dimensioned to capture the second bearing and prevent radial movement of the second bearing.

15. The device of claim 1, including a third bearing disposed between the worm and the second bearing and configured to rotably support the worm; an extension connected to the third bearing; and wherein the thrust surface defines a slot, the extension slidable within the slot.

16. The device of claim 1, further comprising: a pivot and a pivot arm, rotatably connected to the pivot at one end, wherein the thrust surface is mounted at the end of the pivot arm opposite to the pivot end.

17. The device of claim 16, wherein the thrust surface forms one of a cylinder, a spherical cavity and a cone.

18. The device of claim 1, wherein a plurality of the devices are associated with a stringed musical instrument.

19. A device to adjust a string tension, comprising:
- a worm drive including
  - a worm having threads, the worm rotatable about a longitudinal axis, the worm axially displaceable along the longitudinal axis, and
  - a worm wheel having threads mateable with the worm threads;
- a tuning shaft extending away from the worm threads;
- a string takeup shaft affixed to and extending from the worm wheel;
- a bearing surface formed upon the worm and extending away from the worm threads;
- a thrust surface forming a non-orthogonal angle relative to a longitudinal axis of the worm, the thrust surface positioned in a predetermined location relative to the worm wheel, the thrust surface slideably mateable with the bearing surface to urge the worm threads against the worm wheel threads when the worm wheel urges the worm axially under a load transferred from the worm wheel threads to the worm threads; and
- a biasing element disposed within an opening in an end portion of the string takeup shaft, the biasing element configured to releaseably secure a string when the string is inserted in contact with the biasing element.

20. The device of claim 19, wherein the biasing element comprises a set screw threadably retained within the string takeup shaft, the set screw configured thereby to releaseably secure the string inserted into the string takeup shaft.

21. The device of claim 19, wherein the string tension is adjusted to tune a stringed musical instrument.

22. The device of claim 19, wherein the gear ratio of the worm drive is greater than 1:40 and up to 1:100.

23. A device to adjust a string tension, comprising:
- a worm drive including
  - a worm having threads, the worm rotatable about a longitudinal axis, the worm axially displaceable along the longitudinal axis, and
  - a worm wheel having threads mateable with the worm threads;
- a bearing surface formed upon the worm and extending away from the worm threads;
- a thrust surface forming a non-orthogonal angle relative to a longitudinal axis of the worm, the thrust surface positioned in a predetermined location relative to the worm wheel, the thrust surface slideably mateable with the bearing surface to urge the worm threads against the worm wheel threads when the worm wheel urges the worm axially under a load transferred from the worm wheel threads to the worm threads;
- a support shaft axially aligned with the worm threads to rotatably support the worm; and
- a bushing sized larger than the outside diameter of the support shaft, to thereby rotatably support the worm, and to enable the worm to tilt towards the worm gear when the worm is displaced axially.

24. A device to adjust a string tension of a musical instrument, comprising:
- a plurality of string tensioner assemblies, each comprising:
  - a worm drive including a worm including a shaft supporting worm threads, the worm rotatable about a longitudinal axis, the worm axially displaceable along the longitudinal axis, and
  - a worm wheel rotatably affixed to the instrument, and having threads mateable with the worm threads;
  - a bearing surface formed upon the worm shaft and extending away from the worm threads;
  - a thrust ramp forming a non-orthogonal angle relative to a rotational axis of the worm, the thrust surface affixed to the instrument, the thrust ramp slideably mateable with the bearing surface to urge the worm threads against the worm wheel threads when the worm wheel urges the worm axially under a load transferred from the worm wheel threads to the worm threads; and
  - a bushing affixed to the instrument, the bushing sized larger than the outside diameter of the worm shaft, to thereby rotatably support the worm, and to enable the worm to tilt towards the worm gear when the worm is displaced axially.

* * * * *